United States Patent
Kumoi et al.

(10) Patent No.: US 9,855,613 B2
(45) Date of Patent: Jan. 2, 2018

(54) CUTTING TOOL BODY AND CUTTING TOOL

(71) Applicant: TUNGALOY CORPORATION, Iwaki-shi, Fukushima (JP)

(72) Inventors: Haruki Kumoi, Iwaki (JP); Ryuichi Saji, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 281 days.

(21) Appl. No.: 14/649,484

(22) PCT Filed: Dec. 3, 2013

(86) PCT No.: PCT/JP2013/082498
§ 371 (c)(1),
(2) Date: Jun. 3, 2015

(87) PCT Pub. No.: WO2014/088008
PCT Pub. Date: Jun. 12, 2014

(65) Prior Publication Data
US 2015/0298223 A1   Oct. 22, 2015

(30) Foreign Application Priority Data
Dec. 5, 2012   (JP) .................................. 2012-266202

(51) Int. Cl.
*B23C 5/22*   (2006.01)
*B23C 5/02*   (2006.01)
*B23C 5/10*   (2006.01)

(52) U.S. Cl.
CPC ................ *B23C 5/02* (2013.01); *B23C 5/109* (2013.01); *B23C 5/2208* (2013.01);
(Continued)

(58) Field of Classification Search
CPC ...... B23C 5/109; B23C 5/2208; B23C 5/2204
See application file for complete search history.

(56) References Cited

U.S. PATENT DOCUMENTS 6,164,878 A * 12/2000 Satran .................... B23C 5/2221
407/102
7,204,662 B1 * 4/2007 Long, II .................. B23C 5/003
407/103
(Continued)

FOREIGN PATENT DOCUMENTS

AT   12672 U1 * 9/2012 ........... B23C 5/2221
JP   H05-708920 U   9/1993
(Continued)

OTHER PUBLICATIONS

JP 2009-078352 A (Translation) obtained at https://worldwide.espacenet.com/ (last visited May 5, 2017).*
(Continued)

*Primary Examiner* — Daniel Howell
*Assistant Examiner* — Ryan Rufo
(74) *Attorney, Agent, or Firm* — Studebaker & Brackett PC

(57) ABSTRACT

In a body for a cutting tool having an insert seat, to which a cutting insert is removably attached, not only a structure for preventing a crack at the insert seat, caused by stress concentration, is adopted, but also the cutting insert is stably seated at and firmly attached to the insert seat. A recessed curve portion is formed at a crossing portion between a bottom surface and a wall surface of the insert seat. As viewed in cross section perpendicular to the bottom surface, the cross-sectional shape of the curve portion includes an arc having a radius R of curvature within a range from 0.5-1.2 mm. A height from the bottom surface to a connecting portion between the wall surface and the curve portion is set within a range from 0.1-0.8 mm.

11 Claims, 6 Drawing Sheets

(52) U.S. Cl.
CPC .... *B23C 5/2221* (2013.01); *B23C 2200/0416* (2013.01); *B23C 2200/0494* (2013.01); *B23C 2210/168* (2013.01)

(56) References Cited

U.S. PATENT DOCUMENTS

| | | | | |
|---|---|---|---|---|
| 8,647,026 | B2* | 2/2014 | Filho | B23C 5/109 407/33 |
| 2004/0131431 | A1 | 7/2004 | Satran | |
| 2007/0280790 | A1 | 12/2007 | Kovac | |
| 2008/0232912 | A1* | 9/2008 | Bhagath | B23C 5/06 407/114 |
| 2008/0304928 | A1* | 12/2008 | Engstrom | B23C 5/2247 408/229 |
| 2010/0054873 | A1 | 3/2010 | Men et al. | |
| 2010/0080662 | A1 | 4/2010 | Satran et al. | |
| 2010/0158620 | A1* | 6/2010 | Spitzenberger | B23C 5/006 407/40 |
| 2012/0301235 | A1 | 11/2012 | Yoshioka et al. | |

FOREIGN PATENT DOCUMENTS

| | | | | |
|---|---|---|---|---|
| JP | 08-071830 A | * | 3/1996 | ............... B23C 5/10 |
| JP | H 0871830 A | | 3/1996 | |
| JP | 2008-119787 A | | 5/2008 | |
| JP | 2009-078352 A | * | 4/2009 | ............... B23C 5/10 |
| JP | 2011-051029 A | | 3/2011 | |
| WO | WO 2012/003876 | | 1/2012 | |

OTHER PUBLICATIONS

JP 08-071830 (Translation) obtained at https://dossier1.j-platpat.inpit.go.jp/tri/all/odse/ODSE_GM101_Top.action (last visited May 5, 2017).*

AT 12672 (Translation) obtained at https://worldwide.espacenet.com/ (last visited May 5, 2017).*

European Search Report dated Jul. 14, 2016, in EP counterpart application (No. 13860357.6).

International Search Report dated Feb. 18, 2014 issued in PCT counterpart application (No. PCT/JP2013/082498).

Written Opinion of the International Searching Authority issued in PCT counterpart application (No. PCT/JP2013/082498) with English translation.

International Preliminary Report on Patentability (IPRP) dated Jun. 9, 2015 issued in PCT counterpart application (No. PCT/JP2013/082498) with English translation.

* cited by examiner

CUTTING TOOL BODY AND CUTTING TOOL

RELATED APPLICATIONS

This is a 371 US National Phase of International Patent Application No. PCT/JP2013/082498 filed Dec. 3, 2013, and published as WO2014/088008 A1 on Jun. 12, 2014, which claims priority to JP 2012-266202, filed Dec. 5, 2012. The contents of the aforementioned applications are incorporated by reference in their entirety.

TECHNICAL FIELD

The present invention relates to a cutting tool, to which a cutting insert is removably attached for use in cutting materials such as metals, and a body for the tool.

BACKGROUND ART

As for the shape of an insert seat of a cutting tool, to which a cutting insert is attached, it has been typically known that a curve portion is formed between a bottom surface and a wall surface of the insert seat. A conventional cutting tool adopting the structure is exemplified by that disclosed in Patent Literature 1. A cutting tool disclosed in Patent Literature 1 is a cutting tool to which a cutting insert is removably attached, and has a cutout groove having an arcuate cross section, that is, a curve portion formed at a crossing portion between a bottom surface and a wall surface of an insert seat. The curve portion is formed in order to alleviate a stress on the crossing portion between the bottom surface and the wall surface so as to prevent a crack. In view of this, in Patent Literature 1, the curve portion is formed in such a manner as to extend toward the crossing portion from the outer end of the insert seat where a crack is liable to occur. Thus, the curve portion becomes deeper at a portion near the outer end whereas it becomes gradually shallower toward the back.

CITATION LIST

Patent Literature

PTL 1: Japanese Utility Model Laid-open No. H05-70820 (1993)

SUMMARY OF INVENTION

Technical Problem

In this manner, the cutting tool disclosed in Patent Literature 1 is merely configured for the purpose of the prevention of a crack at the crossing portion between the bottom surface and wall surface of the insert seat. Patent Literature 1 does not disclose any specific guideline for the preferred shape of the curve portion or the dimension of each of parts except for a change in depth of the curve portion in such a manner as to meet the purpose.

An object of the present invention is to adopt a structure for preventing a crack caused by stress concentration while providing a configuration in which a cutting insert can be stably seated at and firmly attached to an insert seat.

Solution to Problem

In view of the above, the present invention provides a body (1) for a cutting tool (100) having an insert seat (3), to which a cutting insert (2) is removably attached, wherein the insert seat (3) includes a first surface (4) and a second surface (5) that extend in a direction in which the first surface (4) and the second surface (5) cross each other, the cutting insert (2) abutting against the first surface (4) and the second surface (5) during attachment;

wherein a recessed curve portion (7) extends at the insert seat (3) along a crossing portion between the first surface (4) and the second surface (5);

wherein the cross-sectional shape of the curve portion (7) includes an arc having a radius (R) of curvature within a range from 0.5 mm to 1.2 mm, as viewed in cross section perpendicular to the first surface (4); and wherein a height (H) from the first surface (4) to a connecting portion between the second surface (5) and the curve portion (7) is set within a range from 0.1 mm to 0.8 mm.

Furthermore, the present invention provides a cutting tool (100) comprising: the body (1); and the cutting insert (2) attached to the insert seat (3).

Advantageous Effects of Invention

According to the present invention, the cross-sectional shape of the curve portion (7) includes an arc having a radius R of curvature within a range from 0.5 mm to 1.2 mm, as viewed in cross section perpendicular to the first surface (i.e., a bottom surface 4), and further, the height (H) from the first surface (4) to a connecting portion between the second surface (i.e., a wall surface 5) and the curve portion (7) is set within a range from 0.1 mm to 0.8 mm. In this manner, the second surface (5) of the insert seat (3) or the abutment surface (6) which actually abuts against the cutting insert (2) can approach the first surface (4) in a height direction. In addition, the distance (W) between the first surface (4) of the insert seat (3) and the abutment surface (6) can be kept short, as viewed in the direction opposite to the first surface (4). Consequently, the cutting insert can be stably seated and firmly fixed.

DESCRIPTION OF EMBODIMENTS

Figure 1:
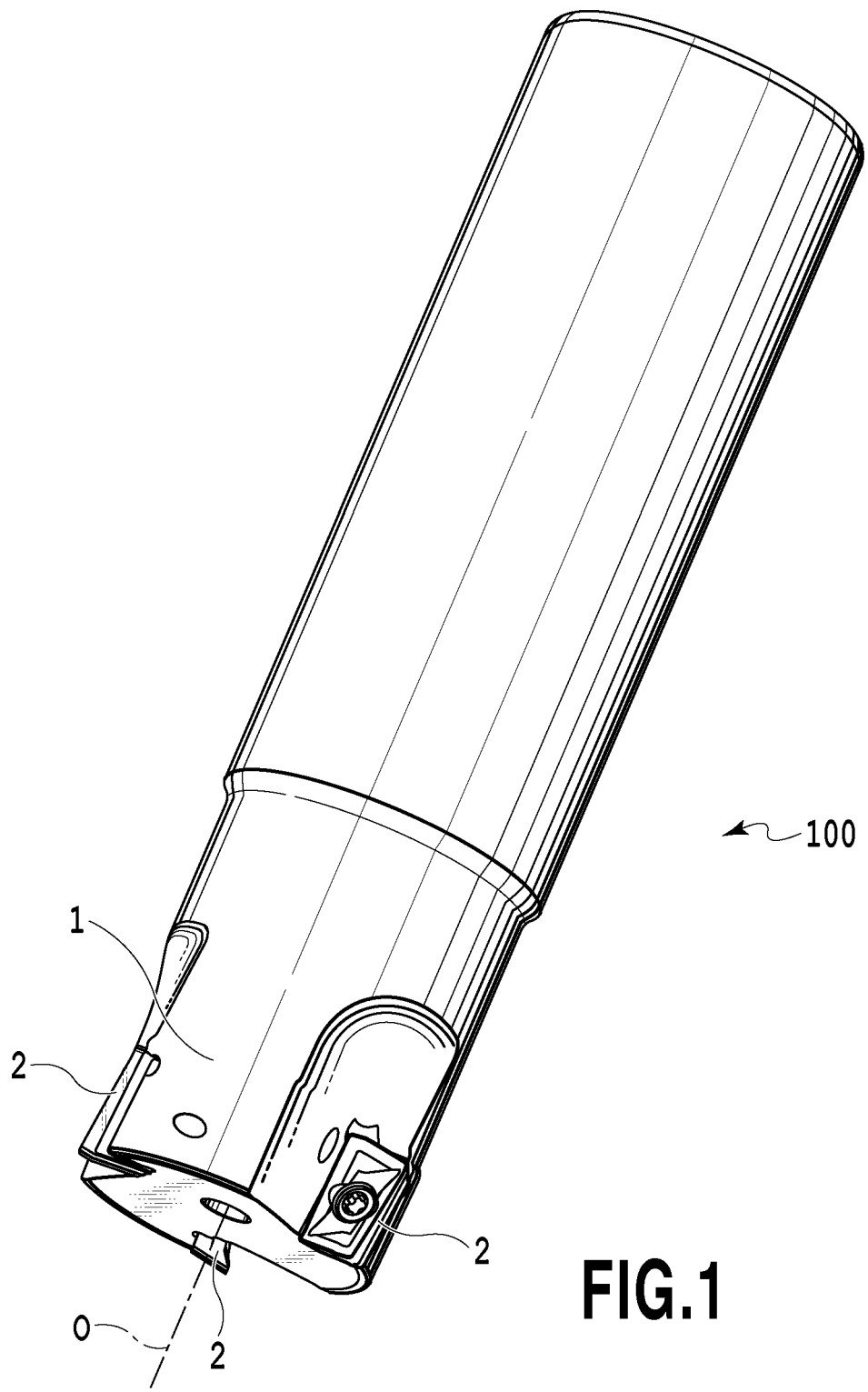
FIG. 1 is a perspective view showing a cutting tool according to one embodiment of the present invention.
Figure 2:
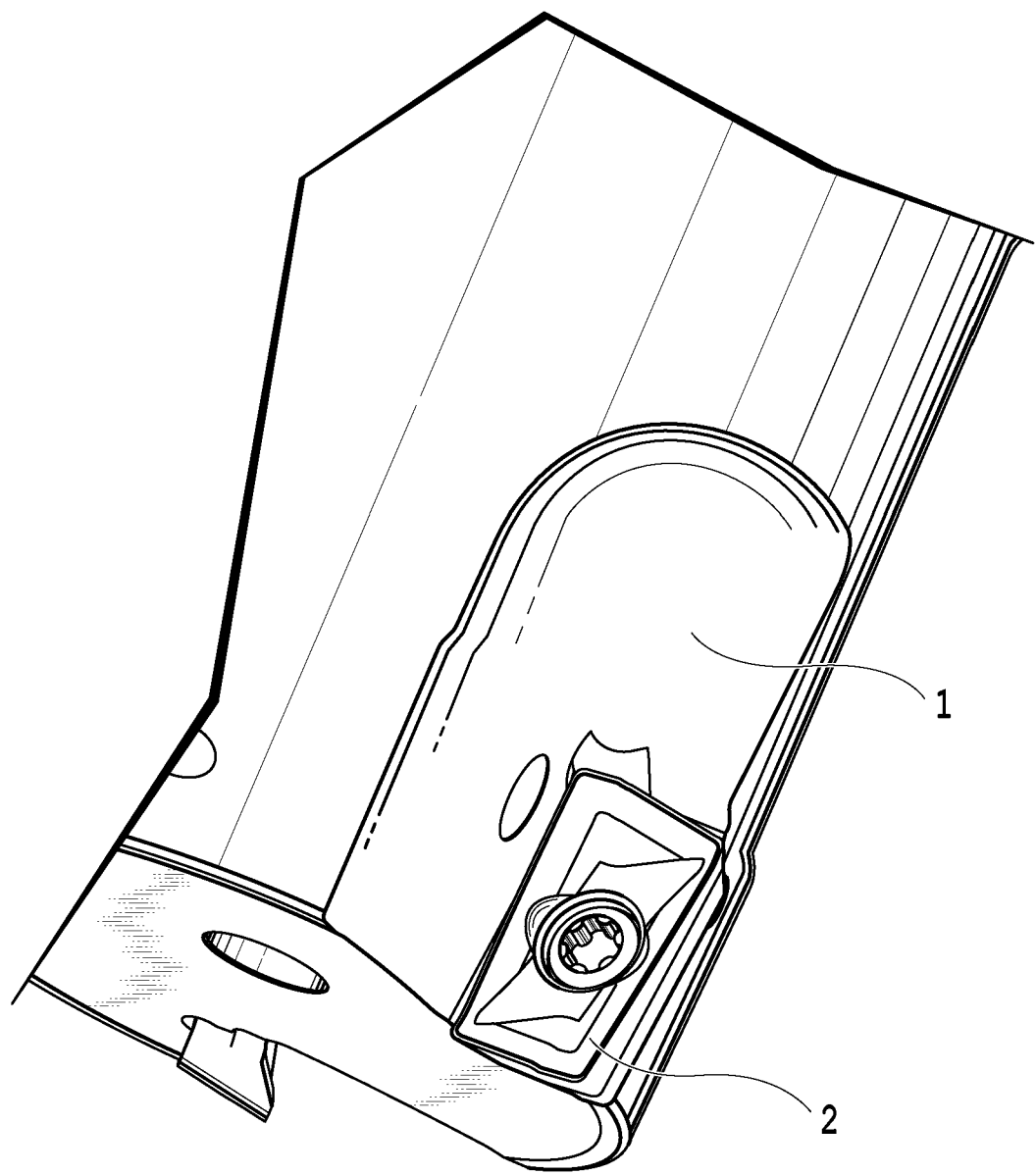
FIG. 2 is an enlarged perspective view showing the surroundings of a cutting insert in the cutting tool shown in FIG. 1.
Figure 3:
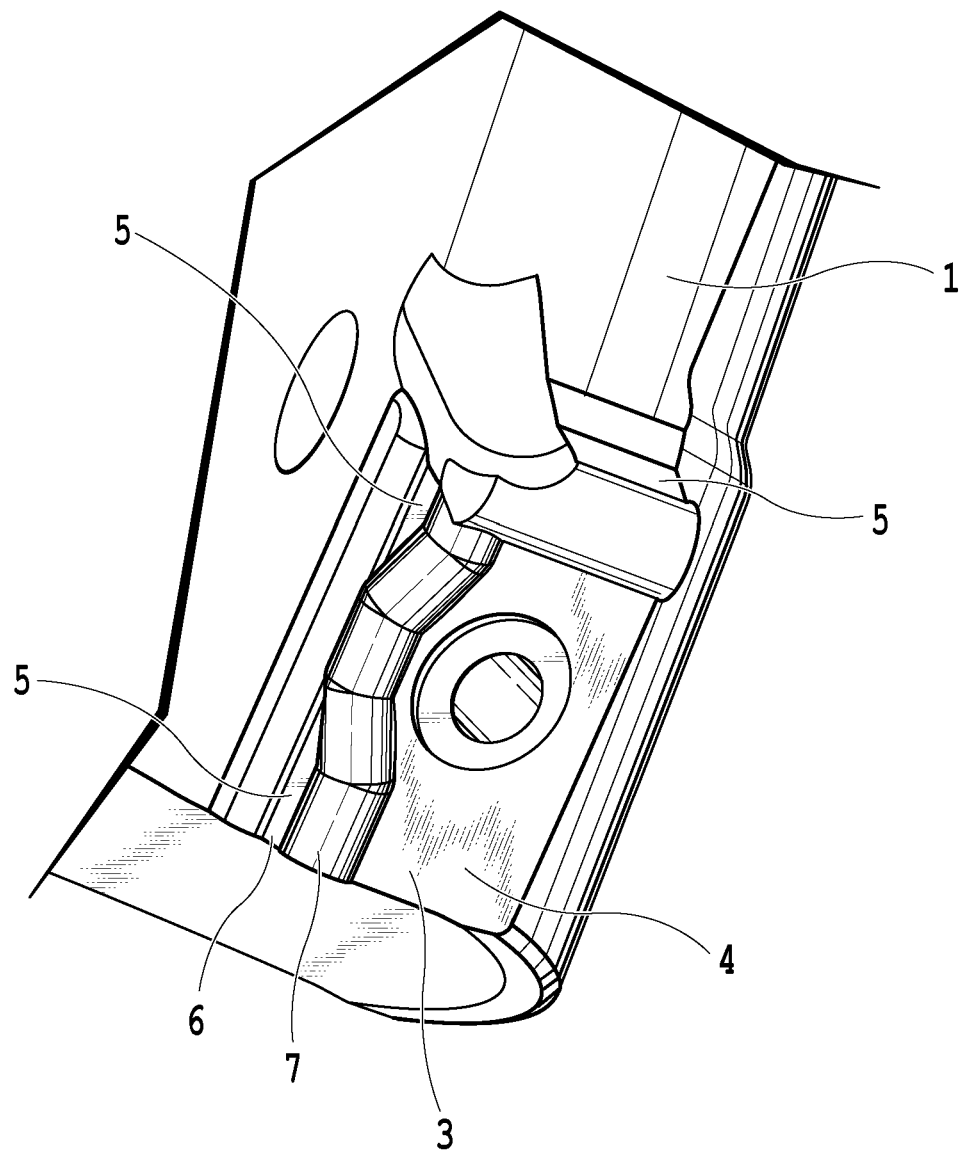
FIG. 3 is an enlarged perspective view showing an insert seat in the cutting tool shown in FIG. 1.

A cutting tool 100 in an embodiment, to which the present invention is applied, will be described with reference to the attached drawings. FIG. 1 is a perspective view showing a cutting tool according to one embodiment of the present invention; FIG. 2 is an enlarged perspective view showing the surroundings of a cutting insert in the cutting tool shown in FIG. 1; and FIG. 3 is an enlarged perspective view showing an insert seat in the cutting tool shown in FIG. 1.

The cutting tool 100 in the present embodiment is an end mill to be used by removably attaching a cutting insert 2 to an insert seat 3 of a body 1. Incidentally, in the present embodiment, the cutting insert 2 has a pair of substantially polygonal opposite surfaces and a side surface connecting the opposite surfaces; a cutting edge is formed on a crossing ridge between at least either one of the opposite surfaces and at least a part of the side surface; and the cutting insert 2 is attached in the state in which the other opposite surface and a part of the side surface abut on the insert seat 3 of the body 1. In the present embodiment, a first surface of the insert seat will be explained as a "bottom surface" in abutment on the other opposite surface, and further, a second surface of the insert seat will be explained as a "wall surface" including a portion in abutment on a part of the side surface of the cutting insert 2. This is for the sake of convenience, and therefore, does not intend to define an absolute orientation or a positional relationship inside a space. This also goes for the term "height" appearing below.

A cutting edge of the cutting insert 2 is formed into a complicated three-dimensional curve on the cutting insert 2 in such a manner that its rotational orbit traces a cylindrical plane. It is difficult to form a complicated wall surface in conformity with the shape of the cutting edge of the cutting insert 2 at the insert seat 3 of the body 1, to which the cutting insert 2 is attached.

In addition, a fabrication cost is increased. In view of this, a portion apart from the cutting edge at a flank of the cutting insert 2 may be formed into a flat surface that functions as an abutment surface against a wall surface 5 of the insert seat 3. The present embodiment is directed to providing the body 1 according to the above-described configuration, and further, the cutting tool 100 having the cutting insert 2 stably fixed thereto. In the body 1, to which the cutting tool 100 is applied, the abutment surface of the wall surface 5 of the insert seat 3 is located near a bottom surface 4 of the insert seat 3, on which the cutting insert 2 actually abuts.

In the meantime, a recessed curve portion 7 having a predetermined radius of curvature is formed at a crossing portion between the bottom surface 4 and the wall surface 5 of the insert seat 3 of the body 1, as viewed in cross section in a direction perpendicular to a rotational center axis O or the bottom surface 4 of the cutting tool 100. The reason why this curve portion 7 is formed is that stress concentration occurring at the crossing portion between the bottom surface 4 and the wall surface 5 of the insert seat 3 is alleviated, the machinability of a cutting tool such as an end mill for use in forming the insert seat 3 is enhanced and the life of the tool is prolonged. Another reason is that a recessed surface having a predetermined radius of curvature also functions as an undercutting section for avoiding any interference between an edge of the bottom surface of the cutting insert 2 and the insert seat 3. Therefore, the curve portion 7 is referred to as the undercutting section or a recessed thinned portion as well.

Specifically, the curve portion 7 is formed in such a manner as to exhibit the cross-sectional shape including an arc having a radius R of curvature within a range from 0.5 mm to 1.2 mm, as viewed in a cross section perpendicular to the bottom surface 4. The radius R of curvature is set in the above-described manner, thus meeting both of a demand for an effect such as stress alleviation and a demand for an effect that the bottom surface 4 of the insert seat 3 and the wall surface 5 of the insert seat 3 are disposed near each other so that the cutting insert 2 can be stably fixed.

While meeting the above-described demands at the same time, it is highly desirable that the area of the abutment surface per se of the wall surface 5 on the cutting insert 2 should be satisfactorily secured, and therefore, the lower end of the wall surface 5, that is, the connecting portion between the wall surface 5 and the curve portion 7 must be sufficiently lowered.

Figure 4:
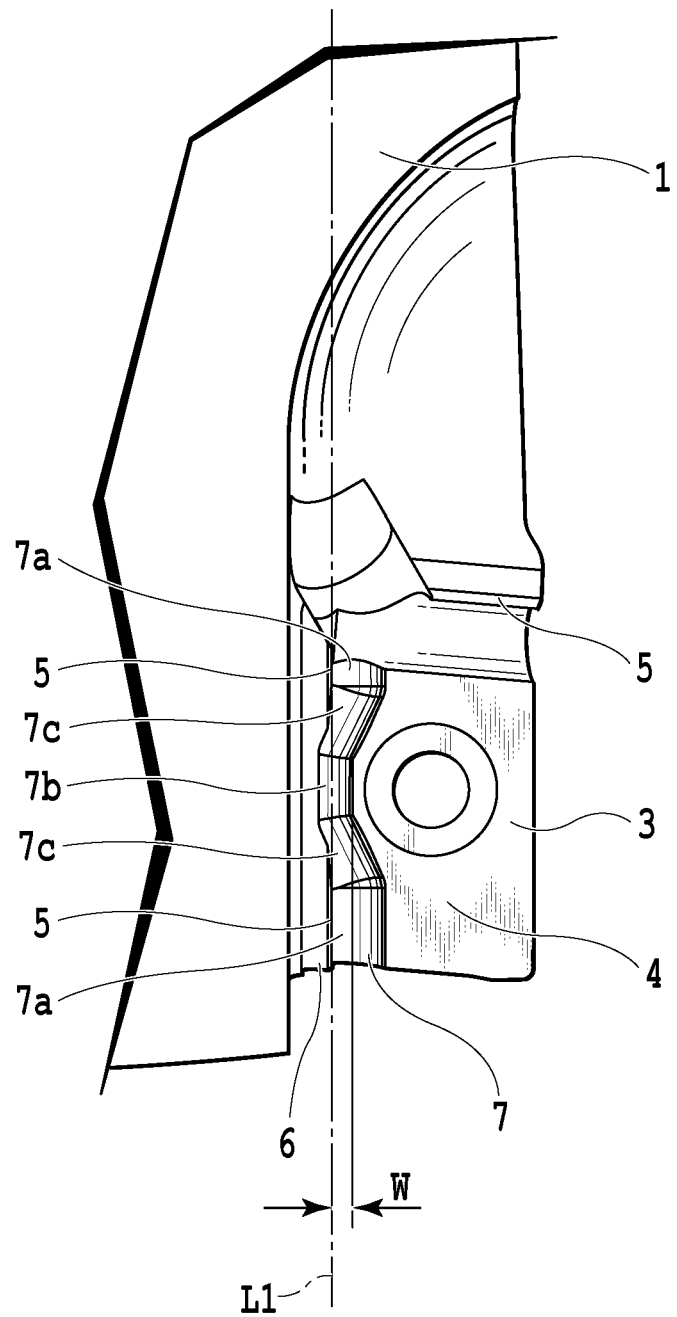
FIG. 4 is an enlarged plan view showing the insert seat shown in FIG. 3.
Figure 5:
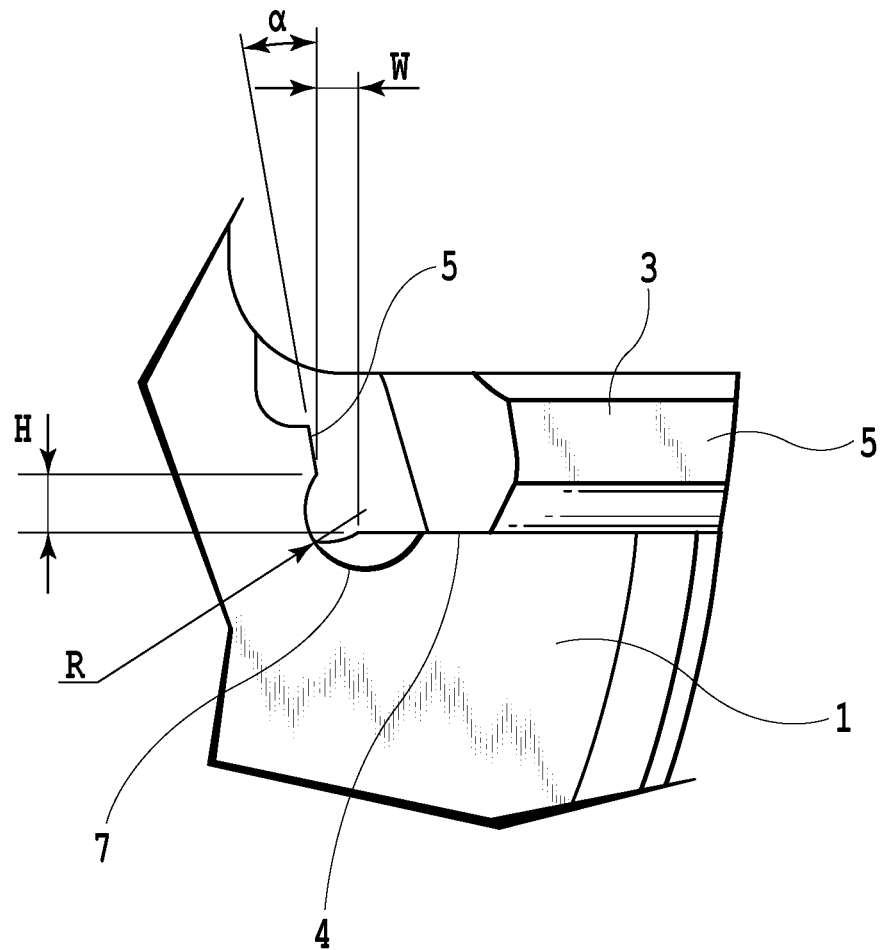
FIG. 5 is an enlarged front view showing the insert seat shown in FIG. 3.

Referring to FIGS. 4 and 5, a description will be given of the preferred dimensions of constituent elements and the shape of the curve portion 7.

A height H of the connecting portion between the wall surface 5 and the curve portion 7 from the bottom surface 4 ranges from 0.1 mm to 0.8 mm. The curve portion 7 having the above-described dimension and shape is formed, thereby achieving the cutting tool in which the cutting insert 2 having a cutting edge formed in a complicated three-dimensional curve can be firmly fixed, and further, the insert seat 3 can be easily machined. A ratio of the height H to the height of the wall surface 5 is 50% or less. The connecting portion between the wall surface 5 and the curve portion 7 is lowermost at the wall surface 5. In particular, in the present embodiment, the height H is 20% or less of the height of the wall surface 5, that is, the connecting portion between the wall surface 5 and the curve portion 7 is considerably low. Here, the height H of the connecting portion between the wall surface 5 and the curve portion 7 from the bottom surface 4 need not always be constant in a direction in which the curve portion 7 extends. For example, the height may be varied with an inclination or a step. In this case, the height H may be set within a range from 0.1 mm to 0.8 mm at any positions in the direction in which the curve portion 7 extends, that is, over the entire curve portion 7 connecting a substantial abutment surface 6 of the wall surface 5 with respect to the cutting insert 2.

In the case where the height H of the connecting portion between the wall surface 5 and the curve portion 7 from the insert seat 3 is reduced whereas the radius R of curvature of the curve portion 7 is increased up to such an extent as to produce an excellent effect regarding stress alleviation, the curve portion 7 may not be formed on the wall surface 5 of the insert seat 3. In view of this, the curve portion 7 may be formed so as to also straddle the bottom surface 4 of the insert seat 3. However, in this case, the bottom surface 4 of the insert seat 3 is separated from the wall surface 5 of the insert seat 3, and therefore, the width of the bottom surface 4 of the insert seat 3 is reduced, so that the area is decreased by the reduction, thereby raising a fear that seating stability of the cutting insert 2 is degraded. That is to say, a problem to be solved that the height H of the abutment surface 6 of the wall surface 5 of the insert seat 3 is reduced while the radius R of curvature of the curve portion 7 is increased is contradictory to a problem to be solved that the bottom surface 4 of the insert seat 3 approaches the wall surface 5, thus securing the satisfactory area of the bottom surface 4.

In view of the above, the present invention is directed to solving these contradictory problems by reducing the height H of the connecting portion between the wall surface 5 and the curve portion 7 from the insert seat 3 while securing a predetermined radius R of curvature of the curve portion 7, and further, enlarging the bottom surface 4 of the insert seat 3 toward the wall surface 5 so as to enhance the seating stability of the cutting insert 2. Specifically, as shown in FIG. 4, when a straight line approximating the connecting portion between the abutment surface 6 against the cutting insert 2 at the wall surface 5 of the insert seat 3 and the curve portion 7 is referred to as an approximate straight line L1, as viewed in a direction opposite to the bottom surface 4 of the insert seat 3, a distance W from the connecting portion between the curve portion 7 and the bottom surface 4 of the insert seat 3 to the approximate straight line L1 can be set to a small range from 0.1 mm to 0.7 mm. When the distance W numerically ranges in the above-described manner, the bottom surface 4 having a satisfactory area can be secured, and thus, the seating stability of the cutting insert 2 can be enhanced. In other words, the distance W represents a distance between the abutment surface 6 and the bottom surface 4, as viewed in a direction opposite to the bottom surface 4, and therefore, a distance relevant to the area of the bottom surface 4. The shorter the distance W, the larger the area, that is, the width of the bottom surface 4. Thus, the cutting insert 2 can be widely supported.

More specifically speaking, as shown in FIGS. 3 and 4, a bent portion is formed in the present embodiment such that a second curve portion 7b is obtained by gouging the wall surface 5 on the way of the extension of the curve portion 7 rather than allowing the curve portion 7 to extend linearly. In this manner, the curve portion 7 includes a first curve portion 7a at which the height H of the connecting portion between the wall surface 5 and the curve portion 7 is reduced so as to secure the predetermined radius R of curvature of the curve portion 7, and the second curve portion 7b for enlarging the bottom surface 4 by gouging the wall surface 5 so as to enhance the seating stability of the cutting inert 2. As shown in FIG. 4, the second curve portion 7b for enlarging the bottom surface 4 of the insert seat 3 bites inward of the wall surface 5. In other words, since the wall surface 5 adjacent to the second curve portion 7b is recessed, no abutment surface 6 is formed adjacent to the second curve portion 7b. In the present embodiment, the curve portion 7 is bent at two or more points such that the first curve portions 7a lowering the lower end of the wall surface 5 appear on both sides of the second curve portion 7b enlarging the bottom surface 4, in the direction in which the curve portion 7 extends. Consequently, the abutment surfaces 6 are formed at two points at both ends, that is, the fore end and the rear end in the axial direction of the insert seat 3. When the abutment surfaces 6 are formed at the two points in this manner, the seating stability of the cutting insert 2 with respect to the wall surface 5 is not degraded but is rather enhanced. That is to say, the partly loss of the abutment surface 6 because of the second curve portion 7b does not raise any problem. If anything, the cutting insert 2 is allowed to abut on the abutment surfaces 6 at both ends, that is, the fore end and the rear end in the axial direction of the insert seat 3, thereby eliminating a fear of occurrence of a play so as to be more advantageous to enhance the seating stability.

Figure 6:
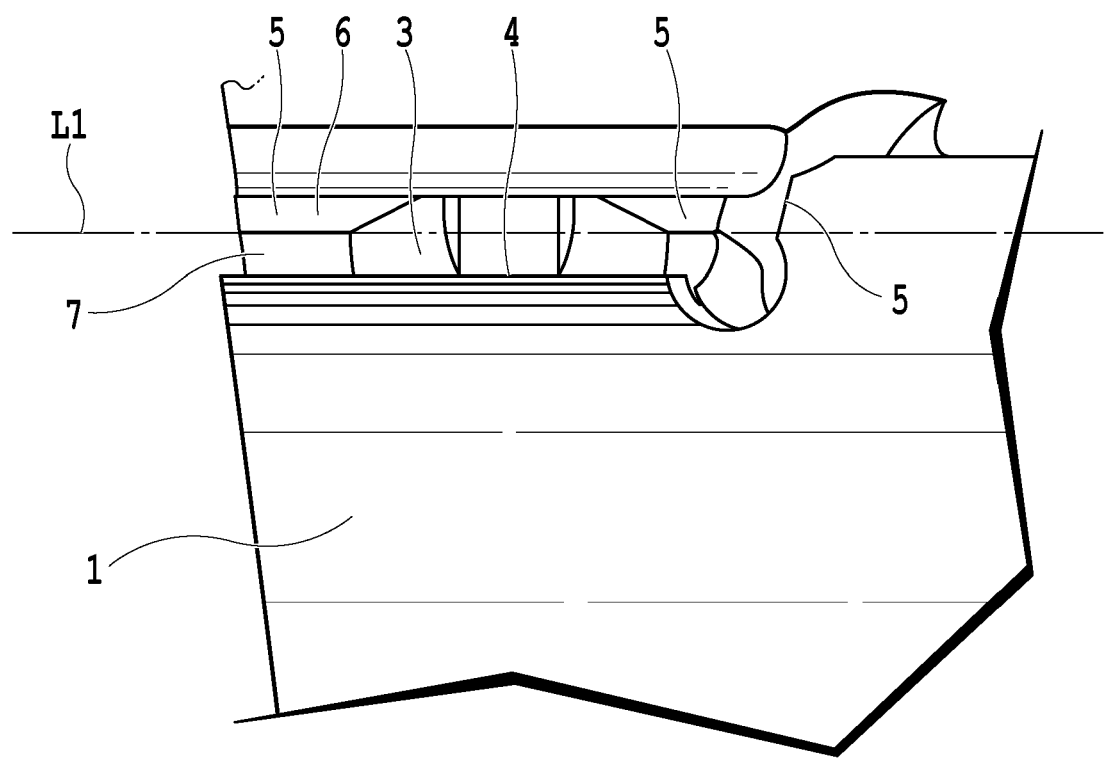
FIG. 6 is an enlarged right side view showing the insert seat shown in FIG. 3.

As viewed in a direction opposite to the bottom surface 4 (FIG. 4), and also as viewed in direction opposite to wall surface 5 (FIG. 6), the approximate straight line L1 extends along a first connecting portion between the wall surface 5 and the curve portion 7. In the body 1 in the present embodiment, in order to secure the area of the bottom surface 4 along the wall surface 5 of the insert seat 3, the second connecting portion between the curve portion 7 and bottom surface 4 of the insert seat 3 has the second curve portion 7b near the approximate straight line L1 (i.e., the straight line connecting the connecting portions between the first curve portions 7a and the wall surface 5, the connecting portions being on both sides in the direction in which the curve portion 7 extends in the present embodiment), as viewed in the direction opposite to the bottom surface 4. Here, in order to gradually enlarge the bottom surface 4 toward the wall surface 5, third curve portions 7c connecting the first curve portions 7a and the second curve portion 7b may be formed at the curve portion 7 in such a manner that the second connecting portion between the curve portion 7 and bottom surface 4 of the insert seat 3 gradually approaches the approximate straight line L1. Thus, as best seen in FIG. 4, the bottom surface 4 is closer to the straight line L1 at the second curve portion 7b than at either of the first curve portions 7a. As also seen in FIG. 4, the second curve portion 7b extends on both sides of the straight line L1, and thus is considered to be formed to straddle the straight line L1 as viewed in the direction opposite the bottom surface 4.

Furthermore, as shown in FIG. 5, the abutment surface 6 of the insert seat 3 may be inclined with respect to the normal of the bottom surface 4 of the insert seat 3. In the case where the flank of the cutting insert 2 is formed into a simple flat shape, the inclination angle α of the abutment surface 6 of the insert seat 3 with respect to the normal of the bottom surface 4 generally corresponds to a clearance angle of the cutting insert 2. In the case where the flank of the cutting insert 2 is formed into a complicated surface, like the cutting tool 100 in the present embodiment, the inclination angle α of the abutment surface 6 of the insert seat 3 with respect to the normal of the bottom surface 4 may be arbitrarily set. When the inclination angle α ranges from 1° to 15°, it becomes similar to that of an insert seat for a cutting insert of a normal positive type, so that the insert seat 3 has a shape to be easily machined. However, the inclination angle is not limited to this, but the inclination angle α of the abutment surface 6 of the insert seat 3 with respect to the normal of the bottom surface 4 may be 0°. Alternatively, the upper portion of the abutment surface 6 may be overhung upward of the bottom surface 4 with a reverse inclination, wherein its inclination angle −α may range from 1° to 15°. With the reverse inclination, the wall surface 5 of the insert seat 3 suppresses uplifting of the cutting insert 2 from the bottom surface 4, thus further enhancing the seating stability of the cutting insert 2.

Table 1 shows first experimental results of Examples of cutting tools configured according to the present invention and Comparative Examples. These are experiments on the height H of the connecting portion between the wall surface 5 and the curve portion 7. The radius R of curvature of the curve portion 7 was 1.0 mm within the range according to the present invention. The cutting was carried out under the following condition: carbon steel S55C was dryly cut at a cutting speed of 150 m/min. and a feed per tooth of 0.1 mm/t by using four square shoulder grinding rotary cutting tools that were formed into a shape similar to that of the embodiment according to the present invention and had a cutter diameter of 50 mm. As a result of the experiments, the area of an abutment surface was insufficient at a height H of 0.9 mm or more, and therefore, it was confirmed that the seating stability of a cutting insert became low and a cutting edge was chipped. In the end, it was revealed that a height H of 0.8 mm or less was desirable.

TABLE 1

|  | R (mm) | H (mm) | Chippings |
|---|---|---|---|
| Example 1 | 1.0 | 0.7 | Not observed |
| Example 2 | 1.0 | 0.8 | Not observed |
| Comparative Example 1 | 1.0 | 0.9 | Observed |
| Comparative Example 2 | 1.0 | 0.10 | Observed |

Table 2 shows second experimental results of Examples of cutting tools configured according to the present invention and Comparative Examples. These are experiments on the distance W. The radius R of curvature of the curve portion 7 was 1.0 mm within the range according to the present invention. The height H was 0.8 mm or 0.6 mm within the range according to the present invention. Other than that, the cutting was carried out under the same condition as that in the first experiment, including using four square shoulder grinding rotary cutting tools that were formed into a shape similar to that of the embodiment according to the present invention and had a cutter diameter of 50 mm. As a result of the experiments, it was confirmed that the seating stability of a cutting insert became low at a distance W of 0.9 mm or more and a cutting edge was chipped. In the end, it was revealed that a distance W of 0.7 mm or less was desirable.

TABLE 2

|  | R (mm) | H (mm) | W (mm) | Chippings |
|---|---|---|---|---|
| Example 3 | 1.0 | 0.8 | 0.5 | Not observed |
| Example 4 | 1.0 | 0.8 | 0.7 | Not observed |
| Comparative Example 3 | 1.0 | 0.8 | 0.9 | Observed |
| Comparative Example 4 | 1.0 | 0.8 | 1.1 | Observed |

The present invention is not limited to the above-described embodiment, and can be variously modified and added within the scope without departing from the subject matter of the present invention. For example, although the curve portion 7 is formed by continuously combining a plurality of linear portions in FIGS. 3 and 4, the present invention is not limited to this, and therefore, the curve portion 7 may be bent in such a manner as to be curvilinearly changed. In other words, the portion 7c may be formed such that the portions 7a and 7b are smoothly connected to each other.

In addition, although the present invention has been described by way of the cutting tool used in an end mill mode in the above-described embodiment, it is to be understood that the present invention should be applied to other cutting tools for turning and drilling. Furthermore, the cutting insert is mounted on the tool body, thereby configuring the cutting tool, and thus, it is to be understood that the present invention should be applied to the cutting tool.

The invention claimed is:

1. A cutting tool body having an insert seat, to which a cutting insert is removably attached,
   wherein the insert seat includes a first surface and a second surface that extend in a direction in which the first surface and the second surface cross each other, the cutting insert abutting against the first surface and an abutment surface of the second surface during attachment;
   wherein a recessed curve portion extends at the insert seat along a crossing portion between the first surface and the second surface, the curve portion comprising a first curve portion (7a) on both sides of a second curve portion (7b);
   wherein as viewed in a direction opposite to the first surface:
      a straight line (L1) extends along a first connecting portion between the second surface and the curve portion; and
      the first surface is closer to the straight line (L1) at the second curve portion (7b) than at either of the first curve portions (7a);
   wherein a cross-sectional shape of the curve portion includes an arc having a radius of curvature within a range from 0.5 mm to 1.2 mm, as viewed in cross section perpendicular to the first surface; and
   wherein a height from the first surface to the first connecting portion between the second surface and the curve portion is set within a range from 0.1 mm to 0.8 mm.

2. The cutting tool body according to claim 1, wherein as viewed in said direction opposite to the first surface, a distance from said straight line (L1) to a second connecting portion between the second curve portion and the first surface of the insert seat is set within a range from 0.1 mm to 0.7 mm.

3. The cutting tool body according to claim 1, wherein the second curve portion is formed to straddle the straight line (L1) as viewed in said direction opposite to the first surface, the second curve portion being formed in such a manner as to gouge the second surface within an extension range of the curve portion.

4. The cutting tool body according to claim 2, wherein the abutment surface is inclined with respect to the normal of the first surface.

5. The cutting tool body according to claim 4, wherein an inclination angle α of the abutment surface with respect to the normal of the first surface is set within a range from 1° to 15°.

6. A cutting tool body having an insert seat to which a cutting insert is removably attachable, the insert seat comprising:
   a bottom surface;
   a wall surface having at least one abutment surface configured to abut a cutting insert, when a cutting insert is attached in the insert seat;
   a recessed curve portion extending along a crossing portion between the bottom surface and the wall surface, the curve portion appearing curved in a view opposite the bottom surface and comprising a first curve portion (7a) on both sides of a second curve portion (7b);
   wherein in said view opposite the bottom surface:
      a straight line (L1) extends along a first connecting portion between the wall surface and the curve portion; and
      the bottom surface is closer to the straight line (L1) at the second curve portion (7b) than at either of the first curve portions (7a);
   wherein a cross-sectional shape of the curve portion includes an arc having a radius of curvature within a range from 0.5 mm to 1.2 mm, as viewed in cross section perpendicular to the bottom surface; and
   wherein a height from the bottom surface to the first connecting portion between the wall surface and the curve portion is set within a range from 0.1 mm to 0.8 mm.

7. A cutting tool comprising:
   the cutting tool body according to claim 6; and
   a cutting insert attached to the insert seat.

8. The cutting tool body according to claim 6, wherein, in said view opposite the bottom surface, a distance (W) from said straight line (L1) to the second curve portion (7b) is set within a range from 0.1 mm to 0.7 mm.

9. The cutting tool body according to claim 6, wherein the curve portion is formed to straddle the abutment surface of the second surface, the curve portion being formed in such a manner as to gouge the second surface on the way within an extension range of the curve portion.

10. The cutting tool body according to claim 6, wherein the abutment surface is inclined with respect to the normal of the bottom surface.

11. The cutting tool body according to claim 10, wherein an inclination angle $\alpha$ of the abutment surface with respect to the normal of the bottom surface is set within a range from 1° to 15°.

* * * * *